United States Patent Office 3,660,348
Patented May 2, 1972

3,660,348
COATING COMPOSITIONS BASED ON VINYL POLYMERS
Roger Garnier, Lyon, Roger Hogenmuller, Sainte-Foy-les-Lyon, and Jacques Massebeuf, La Sarranziniere, France, assignors to Rhone-Poulenc S.A., Paris, France
No Drawing. Filed Mar. 5, 1969, Ser. No. 804,665
Claims priority, application France, Mar. 6, 1968, 142,608
Int. Cl. C08f 45/28
U.S. Cl. 260—41
5 Claims

ABSTRACT OF THE DISCLOSURE

Polymers of vinyl esters of certain branched chain aliphatic monocarboxylic acids, alone or with a proportion of other vinyl esters as comonomers, dissolve in aliphatic hydrocarbons to give solutions useful in paints.

---

The present invention relates to solutions of vinyl polymers which can be used for the coating of surfaces.

Coating compositions, particularly paints containing a coating material dissolved in a solvent phase, retain a dominant position in numerous applications despite the progress of emulsion paints, for example in the external coverings of buildings (Grandou & Pastour, Peintures et Vernis (Paints and Varnishes) 1967, page 127).

The legislation of numerous countries controls the use of supposedly toxic products. In France, for example, only solvents containing less than 5% of aromatic compounds can be used without any restriction. It is for this reason that white spirit No. 1, which is a mixture of aliphatic hydrocarbons (containing about 2.5% of aromatic hydrocarbons) arising from the distillation of petroleum at between 150 and 190° C., is increasingly used as the solvent in paints or other coating compositions. However, the use of this type of solvent is restricted to a small number of paints and varnishes, in particular paints and varnishes based on oils because its solvent power is relatively low, and it has not hitherto been possible to use it as the solvent in coating compositions based on vinyl polymers. This is obviously regrettable in view of the value of vinyl polymers in the manufacture of paints.

The present invention provides new coating compositions which are essentially solutions in aliphatic hydrocarbons containing less than 5% of aromatic compounds of vinyl polymers derived from monomers of which at least a part consists of vinyl esters of saturated aliphatic monocarboxylic acids in which the carboxyl groups are bonded to tertiary or quaternary carbon atoms. For brevity, these esters are hereafter called "vinyl esters of branched chain acids."

The invention also provides a process for easily obtaining such coating compositions which consist of polymerising the vinyl esters of branched chain acids dissolved in the solvent alone or in admixture with a comonomer, and optionally adding appropriate adjuvants (pigments, fillers, or thickeners) to the solution obtained.

Amongst the branched chain acids, acids which are very suitable are the mixtures of acids obtained by reaction of formic acid, or carbon monoxide and water, with mixtures of olefines containing 4 to 18 carbon atoms per molecule (for example dimers or trimers of isobutene or propylene) in the presence of catalysts, such as sulphuric acid or phosphoric acid. The preparation of this type of acid is described in French Pat. No. 1,350,937. Particularly valuable acids are those derived from monoolefines having from 8 to 10 carbon atoms. The preparation of the vinyl esters of branched chain acids may be carried out by known processes, for example by reacting the branched acids with vinyl acetate in the presence of a mercury salt (as in French Pat. No. 1,350,937).

The monomers which can be copolymerised with the vinyl esters of branched acids to form the film-forming constituent of the compositions of the invention include vinyl chloride and vinyl esters of unbranched monocarboxylic acids, such as for example, the vinyl esters of saturated aliphatic monocarboxylic acids containing 2 to 18 carbon atoms, e.g. vinyl acetate, vinyl propionate, vinyl laurate, vinyl stearate, or the vinyl esters of aromatic acids of the benzene series, e.g. vinyl benzoate.

The mechanical properties of the polymers depend on the nature of the monomers and, in the case of copolymers, on the proportion of the co-monomers. In the case where a single non-branched co-monomer is copolymerised with one or more branched esters, it is necessary that the content of vinyl chloride or of unbranched vinyl ester should not be so great that the polymers obtained are not soluble in all proportions in the aliphatic hydrocarbon solvent (that is to say, the solutions of these co-polymers should not turn cloudy if very greatly diluted with this solvent). The maximum permissible content of unbranched vinyl monomer also depends on the polymerisation process used and on the nature of the particular vinyl esters of branched chain acids which are used. The order of magnitude of this maximum content by weight is given below for the case where vinyl esters produced from a mixture of branched $C_9$ to $C_{11}$ monocarboxylic acids are used: vinyl acetate, 40% by weight; vinyl chloride, 20 to 35%; vinyl propionate, 65%; and vinyl benzoate, 30%.

If more than one vinyl monomer other than a vinyl ester of a branched chain acid is used, it is still necessary to maintain a certain proportion of vinyl esters of branched chain acids, sufficient to produce polymers which are soluble in white spirit No. 1, in all proportions. This proportion varies with the nature of the co-monomers but generally exceeds 30% by weight, and especially when the comonomer is vinyl chloride, should preferably be at least 65% by weight.

If the vinyl polymer is a polymer only of vinyl esters of branched chain acids, its mechanical properties are rather poor. It is therefore generally preferred to use copolymers of vinyl esters of branched chain acids with vinyl chloride and/or vinyl esters of unbranched acids.

The solution polymerisation of these vinyl esters of branched chain acids with or without another copolymerisable ester can be effected in manner known per se. The usual polymerisation catalysts for vinyl monomers are employed; in general, a compound which forms free radicals, such as an organic peroxide, e.g. lauroyl peroxide, benzoyl peroxide or ditertiary butyl peroxide, or another peroxidic compound such as isopropyl percarbonate, or a diazo compound such as alpha, alpha-azo-bis-isobutyronitrile, is used.

The amount of catalyst employed can vary within wide limits. Generally, an amount from 0.01 to 1% by weight based on the monomers is suitable. This amount is generally introduced in several stages during the reaction. It is also possible to bring about the polymerisation by irradiation, for example by ultra-violet light.

The temperature of polymerisation is generally between 20 and 150° C., and preferably between 40 and 100° C.

The polymerisation preferably takes place in the absence of air. The process is thus carried out in a reactor which has beforehand been purged with a stream of an inert gas such as nitrogen.

The reagents can be brought into contact in various ways. It is, for example, possible to mix all the reagents and to raise the whole to the appropriate temperature for the polymerisation. It is also possible to add one or more of the components gradually or in portions acocrding to well known techniques in the polymerisation of vinyl compounds. In the invention, this latter working method is preferably used and at the start the whole of the vinyl esters of branched chain acids, the whole or a part of the solvent, and only a part of the co-monomer or co-monomers are introduced, the subsequent introduction of the remainder of this monomer, or these monomers, being carried out continuously or in stages. This technique has the adavntage of allowing very homogeneous polymers to be obtained.

The solutions obtained can be used as such as varnishes or, for example, for the coating of paper or fabric, or can be mixed with various materials such as pigments, fillers, or thickeners to produce paints. In particulaar, the paints prepared according to the invention can advantageously be used to protect the exterior of buildings because they are insensitive to water and to chemical agents; they are very resistant to abrasion and do not yellow in light; and, they are particularly suitable for coating and reinforcing substrates which tend towards dusting.

The examples which follow illustrate the invention.

EXAMPLE I

The apparatus used comprises:

(a) an enamelled 50-litre autoclave provided with a tube for taking samples, a stirrer, devices for regulating the heating and controlling the pressures and temperatures, and pumps for introducing the reagents;

(b) a 10-litre stainless steel bomb containing vinyl chloride, placed on a balance and connected to the autoclave.

10,240 g. of vinyl esters of branched $C_9$ to $C_{11}$ monocarboxylic acids (sold commercially under the trade name of "Versatate VEOVA 911") are introduced into the autoclave. The autoclave is closed, the air is expelled by applying a vacuum (650 mm. of mercury pressure reduction) and nitrogen is introduced up to 2 bars. The vacuum is again applied and 8000 g. of white spirit No. 1 and 1920 g. of vinyl chloride (initial weight ratio of "Versatate VEOVA 911"/vinyl chloride: 84.2/15.8) are introduced. Stirring is started (at 200 revolutions per minute) and 19.2 g. of a 30% strength solution of isopropyl percarbonate in ethyl maleate are introduced into the autoclave. The pipeline is rinsed with 300 g. of cold white spirit No. 1. The mixture is heated to 55° C. The pressure inside the autoclave is about 0.7 bar. When it drops to 0.6 bar 100 g. of vinyl chloride are introduced and this operation is repeated each time the pressure drops to 0.6 bar (approximately every 10 minutes).

After about 4 hours, when a total of 4460 g. of vinyl chloride has been introduced (final weight ratio of "Versatate VEOVA 911"/vinyl chloride: 69.7/30.3), samples taken show a light clouding on very great dilution with white spirit No. 1. The introduction of this monomer is then stopped. The polymerisation is continued after reducing the speed of stirring (to 150 revolutions per minute), with 19.2 g. of the catalyst solution being introduced 3 times in the 3rd, 7th and 16th hours, and with the pipelines being rinsed each time with 300 g. of white spirit No. 1. At the last introduction of catalyst, 400 g. of white spirit are added. After 19 hours, the mass is heated to 65° C. for 2 hours and then to 75° C. for 1 hour. It is cooled and withdrawn at 30° C. under a slight nitrogen pressure. A 60.5% strength resin solution which is perfectly limpid and colourless is thus obtained. The vinyl chloride content of the resin is 30.3%. The viscosity at 20° C. (Ford cup No. 4), at a concentration which is adjusted to 50% by adding white spirit No. 1, is measured by a flow time of 4 minutes 47 seconds.

100 g. of the 60.5% strength resin solution can be diluted with 111 g. of white spirit No. 1, corresponding to a resin concentration of 28.8%, before any cloudiness appears.

In another experiment, where the vinyl chloride content of the polymer was limited to 28% (to do this it is necessary to limit the total amount of vinyl chloride introduced to 28% by weight of the monomers), a resin solution is obtained which can be diluted in all proportions with white spirit No. 1.

EXAMPLE II

The same reagents are used as in Example I, but all the reagents are introduced at the beginning, that is to say the "Versatate VEOVA 911," the vinyl chloride and white spirit, with only the catalyst being introduced in several stages. (For 10,240 g. of "Versatate VEOVA 911," only 2,560 g. of vinyl chloride are introduced). The copolymer obtained has a vinyl chloride content of 20% and is soluble in white spirit No. 1 in all proportions.

EXAMPLE III

The following are introduced into the apparatus described in Example I: 2166 g. of vinyl chloride; 9828 g. of vinyl esters of branched $C_9$ to $C_{11}$ monocarboxylic acids (sold commercially under the trade name of "Versatate VEOVA 911") and 9366 g. of white spirit No. 1. Stirring is started (at 200 revolutions per minute) and the temperature is raised to 55° C. The pressure inside the autoclave is 2 bars. 120 cm.³ of 30% isopropyl percarbonate solution in ethyl maleate are introduced and the pipeline is rinsed with 250 cm.³ of white spirit No. 1. When the pressure in the autoclave drops to 1.96 bars, 110 g. of vinyl chloride are introduced and this introduction of about 110 g. of vinyl chloride is repeated each time that the pressure prevailing in the autoclave drops by 0.04 bars from the value of this pressure before the preceding introduction of vinyl chloride. During the polymerisation 120 cm.³ of the catalyst solution described above are also added to reactivate the reaction and the pipeline is rinsed with 150 cm.³ of cold white spirit.

When the total of the vinyl chloride introduced during the polymerisation reaches 2457 g., this introduction is stopped, the speed of stirring is reduced to 135 revolutions per minute and the polymerisation is continued for 12 hours, adding 60 cm.³ of the catalyst solution at the 8th hour. After 12 hours, the temperature is raised to 65° C. and kept at 65° C. for 4 hours, and the mixture is then cooled to 40° C. and withdrawn under a slight nitrogen pressure.

A perfectly limpid and colourless solution is obtained containing 60% of a copolymer comprising 32% of vinyl chloride, this solution being capable of dilution with white spirit No. 1 in all proportions.

EXAMPLE IV–VIII

Working as in Example I and replacing a part of the "Versatate VEOVA 911" by other vinyl esters, copolymers having the composition by weight indicated below are prepared in solution:

EXAMPLE IV

| | Percent |
| --- | --- |
| Vinyl chloride | 17.3 |
| Vinyl acetate | 18.2 |
| "Versatate VEOVA 911" | 64.5 |

EXAMPLE V

| | |
| --- | --- |
| Vinyl chloride | 21.4 |
| Vinyl propionate | 19.6 |
| "Versatate VEOVA 911" | 59 |

EXAMPLE VI

| | |
| --- | --- |
| Vinyl chloride | 17.8 |
| Vinyl benzoate | 20.5 |
| "Verosatate VEOVA 911" | 61.7 |

EXAMPLE VII

| | |
| --- | --- |
| Vinyl chloride | 30 |
| Vinyl laurate | 20 |
| "Versatate VEOVA 911" | 50 |

EXAMPLE VIII

| | |
|---|---|
| Vinyl chloride | 32.2 |
| Vinyl stearate | 18.8 |
| "Versatate VEOVA 911" | 49 |

These resin solutions are capable of dilution with white spirit No. 1 in all proportions.

EXAMPLES IX–XI

Working as in Example II, but replacing the vinyl chloride by another vinyl monomer, copolymers are prepared in solution which have the following composition by weight:

EXAMPLE IX

| | Percent |
|---|---|
| Vinyl acetate | 40 |
| "Versatate VEOVA 911" | 60 |

EXAMPLE X

| | |
|---|---|
| Vinyl propionate | 65 |
| "Versatate VEOVA 911" | 35 |

EXAMPLE XI

| | |
|---|---|
| Vinyl benzoate | 30 |
| "Versatate VEOVA 911" | 70 |

These resin solutions are capable of dilution with white spirit No. 1 in all proportions.

EXAMPLE XII

A paint is prepared containing:

| | G. |
|---|---|
| Polymer solution of Example I (resin concentration 60.5%) | 290 |
| Turpentine essence | 17 |
| Rutile titanium dioxide | 220 |
| Calcium carbonate sold under the trade name "Calibrite 14" | 175 |
| Micronised mica | 55 |
| Calcium carbonate | 75 |
| White spirit No. 1 | 168 |
| | 1000 |

This paint has the following characteristics:

| | |
|---|---|
| Solids content | 70%. |
| Weight ratio of pigments/binder | 3/1. |
| Pigment concentration by volume | About 54%. |
| Ford No. 4 cup viscosity | 162 seconds. |

This paint can be diluted with white spirit No. 1 and a brush steeped in it can be cleaned perfectly with white spirit.

A film obtained from this paint resists more than 100,000 brush strokes in a wet abrasion resistance test carried out with a Doittau plynometer.

The paint is tested for resistance to degradation on an alkaline substrate. In this test, two coats of the paint are applied by brush, at 24 hour intervals, to one of the faces of an alkaline material, in this case a sheet of asbestos cement. At the end of 4 days, after applying the second coat, the painted sheet is immersed in water so that half the paint film is immersed with the other half in contact with the air. After one month's immersion no change in appearance or cohesion of the paint film was observed.

When this paint is applied to a powdery substrate (that is to say a surface having a coating which disintegrates), it consolidates the latter significantly.

We claim:

1. A solution in a petroleum distillate boiling at 150° to 190° C. and containing less than 5% of aromatic compounds of a polymer of vinyl esters of $C_9$ to $C_{11}$ saturated monocarboxylic acids in which the carboxyl group is bonded to a tertiary or quaternary carbon atom, or of a copolymer of said vinyl esters with up to 35% of at least one monomer selected from the group consisting of vinyl chloride, a vinyl ester of a saturated unbranched aliphatic monocarboxylic acid containing from 2 to 18 carbon atoms and a vinyl ester of an aromatic monocarboxylic acid.

2. A solution according to claim 1 in which the said monocarboxylic acid is a mixture obtained by reaction of dimers and trimers of isobutene and propylene with formic acid or with carbon monoxide and water, in the presence of a catalyst.

3. A solution according to claim 1 in which the first said vinyl ester is copolymerised with vinyl chloride, vinyl acetate, vinyl propionate, vinyl laurate, vinyl stearate, vinyl benzoate or a mixture thereof.

4. A solution according to claim 1 in which the petroleum distillate boiling at 150° to 190° C. and contains about 2.5% of aromatic compounds.

5. A solution as claimed in claim 1 which also contains a pigment.

References Cited

UNITED STATES PATENTS 2,310,780    2/1943    Hanford et al. _____ 260—89.1

FOREIGN PATENTS 1,350,937    12/1963    France.

OTHER REFERENCES

Brandrup et al.: Polymer Handbook, Interscience Pub., New York, 1966, page IV–194.

MORRIS LIEBMAN, Primary Examiner

J. H. DERRINGTON, Assistant Examiner

U.S. Cl. X.R.

260—41, 80.81, 85.7, 87.1, 89.1